Inventors
Walter Rethel,
Wilmar Laute,
Ernst Mühlberg,
By
Attorneys

Patented Feb. 20, 1940

2,191,239

UNITED STATES PATENT OFFICE 2,191,239

TANK ARRANGEMENT FOR AIRCRAFT

Walter Rethel, Augsburg, and Wilmar Laute and Ernst Mühlberg, Brandenburg (Havel), Germany, assignors to Arado Flugzeugwerke Gesellschaft mit beschränkter Haftung, Brandenburg (Havel), Germany, a German company Application August 29, 1938, Serial No. 227,402
In Germany September 1, 1937

4 Claims. (Cl. 244—135)

This invention relates to the fitment of a tank in an aircraft element, such, for example, as a float, fuselage, wing, or like structural member.

The arrangement according to the invention finds use particularly in aircraft which are launched by means of a catapult. With such aircraft there are difficulties in so distributing the forces of inertia, which are extraordinarily great with catapult launching, by way of the mount for the tank into the shell of the hollow body that receives the tank, or into the longitudinal joints of said body with such certainty that no injurious stresses and loosening of the joints will be experienced.

In the known arrangements the tank is secured within the aircraft element by means of bands or straps to beams arranged above the tank, which beams, in turn, are attached by suitable bearings to the longitudinal joints of the outer skin. Such constructions suffer from the drawback that the tank walls are not only subjected to tensile stress but are also subjected in increased measure to bending and compression stresses.

If, thus, the bending stresses were to be taken up, the known constructions were given a substantial weight and were also very unwieldy in erection. It is to be kept especially in mind that not only must the tank walls proper be constructed of suitable thickness on account of the bending stresses set up therein, but also the dimensioning of the supplemental structural elements, such as beams, bearings and the like leads to substantial increase in weight.

The invention avoids the drawbacks of the heretofore known tank fittings by reason that the tank is mounted directly on transverse frames or bulkheads of the hollow body and is secured by splayed brackets to the skin of the hollow body or to the longitudinal joints.

Hereby there is obtained the result that the horizontally directed forces of inertia set up with a catapult start, as also the vertically directed forces of inertia set up on alighting on land or water, produce tensile forces in the tank walls, which tensile forces are transmitted by way of the connecting brackets to the longitudinal joints of the hollow body in which the tank is contained. By the arrangement of such brackets at both tank ends it is ensured that concussive stresses from any direction can be taken up by the tank skin as tensile forces.

The accompanying drawing illustrates an example of the fitting of a tank in a float of a hydroaeroplane.

Figure 1:
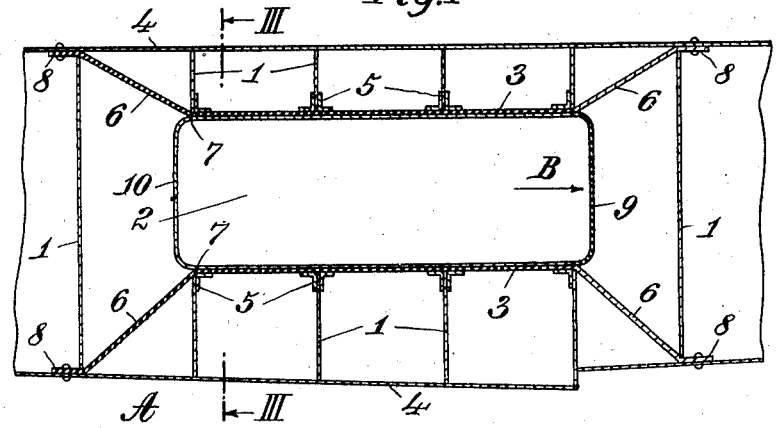

Fig. 1 is a partial longitudinal section through the float, showing the tank fitted therein in the stress conditions experienced during a catapult start. The parts of the tank wall and of the holding bands or straps subjected to tension are shown with extra hatching.

Figure 2:
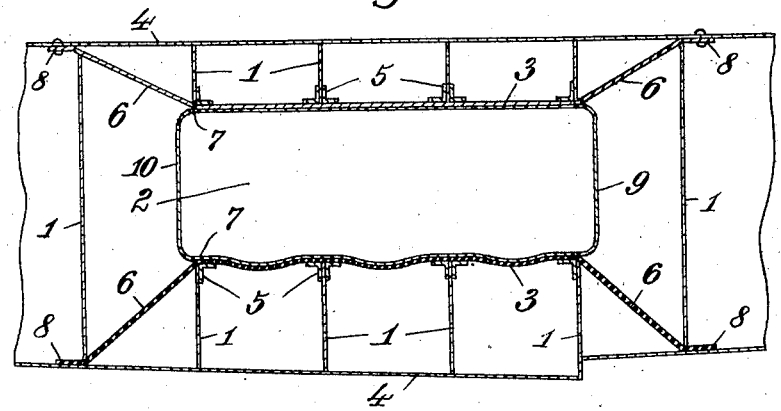

Fig. 2 shows the same tank fitting but in condition for alighting on water. The wall portions of the tank and the bands or straps and brackets subjected to tensile stress by the liquid pressure and by the shock on alighting are likewise emphasized by extra hatching. The flexing of the tank wall and of the straps by the liquid pressure is somewhat exaggerated in the drawing.

Figure 3:
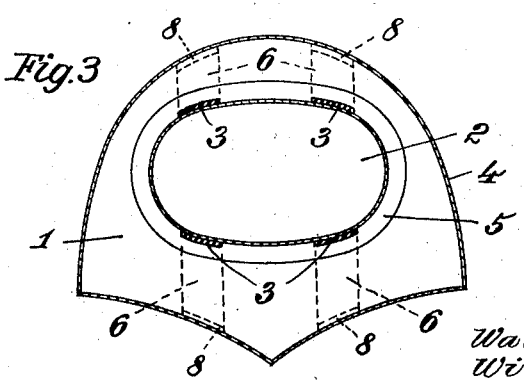

Fig. 3 is a cross section on the line III—III of Fig. 1.

In the embodiment illustrated the float is stiffened by a plurality of parallel transverse frames 1 arranged perpendicularly to the skin 4 of the float, these frames 1 being in the form of sheet metal bulkheads. At the middle the frames 1 are formed with oval cut-outs for the reception of a tank 2 of oval shape in cross section provided with suitable end walls 9 and 10.

The tank 2 is connected with the transverse frames 1 by angle-bar rings 5 which embrace the tank. In the longitudinal direction there are fitted to the lateral wall of the tank several spaced longitudinal straps 3, the extensions of which extend at the front end wall 10 of the tank considered in the direction of flight as splayed brackets 6 whereby the tank is connected with the outer skin 4 of the float at the points 8.

With a catapult start in the direction of the arrow A (Fig. 1) the contents (not illustrated) of the tank, exercise a force of inertia in the direction of the arrow B on the rear wall 9 of the tank.

This force of inertia, which may be of considerable amount, exercises a fluid pressure on the end wall 9 of the tank and sets up therein in consequence of its diaphragm-like formation and pre-curvature almost no tensile stresses. These tensile stresses are transmitted by the longitudinal straps 3 and the brackets 6 to the points 8 on the outer skin 4 of the float.

Both at the points 7 of connection of the brackets 6 with the wall 10 of the tank and also at the points 8 where the brackets 6 are connected with the skin 4 of the float there are set up transverse component forces. In order to take up these transverse forces, it is desirable to arrange transverse bulkheads or frames both at the points 8 and at the points 7.

As the transverse frames or bulkheads are directly connected with the wall of the tank, they provide a good transverse stiffening, taking up the vertical forces of inertia set up by the tank contents on alighting, and transmitting the same to the outer skin 4 of the float and to its longitudinal joints.

In Fig. 2. the tank is shown in the conditions existing on the alighting of the craft on water.

Due to the force of inertia set up by the liquid contents of the tank, the lower longitudinal wall of the tank tends to buckle sinuously, as shown in somewhat exaggerated fashion in the drawing. The lower brackets 6, the tank skin 7 and the longitudinal straps 3 are in this case subjected to tension. Buckling is avoided inasmuch as, due to the concussive force set up on alighting, the holding straps and therewith the tank skin are likewise subjected to tension, but in a much greater measure, as the whole arrangement consisting of the outer skin 4, the brackets 6, the bulkheads 1, and the straps 3, as well as the tank skin act as a deformable elastic unit.

We claim:

1. A construction for aircraft and the like comprising a hollow structural member forming an aircraft element, a plurality of bulkheads extending transversely of said structural member, a number of said bulkheads having aligned openings therein to receive and support a tank, a tank disposed in said openings to be supported by said bulkheads in spaced relation to the walls of said structural member, and at least one strap attached at one end directly to the tank wall and at the other end to the wall of said hollow structural member.

2. The combination claimed in claim 1, in which the strap is secured to parts of the skin of the hollow structural member at which bulkheads are connected therewith.

3. The combination claimed in claim 1 in which the transverse bulkheads are connected with the tank by knees so as to form at the same time a transverse stiffening for the tank.

4. The combination claimed in claim 1, there being a plurality of said straps, said straps being spaced and being disposed in longitudinal direction with respect to the motion of the aircraft, the end extensions of said straps beyond the ends of the tank being formed as inclined brackets secured to the wall of said hollow member, whereby the tank walls are stiffened and whereby the possibility of injury to the tank caused by sudden acceleration or deceleration of the aircraft is materially lessened.

WALTER RETHEL.
WILMAR LAUTE.
ERNST MÜHLBERG.